Patented Apr. 13, 1937

2,077,066

UNITED STATES PATENT OFFICE 2,077,066

METHOD FOR THE PREPARATION OF ARALKYL ETHERS OF CELLULOSE

Eugene J. Lorand, Wilmington, Del., assignor to Hercules Powder Company, Wilmington, Del., a corporation of Delaware No Drawing. Application August 20, 1934, Serial No. 740,651

16 Claims. (Cl. 260—152)

This invention relates to a method for the preparation of aralkyl ethers of cellulose, and more particularly to a method for the preparation of benzyl cellulose.

Aralkyl ethers of cellulose are produced by the reaction of an aralkyl halide upon an intimate mixture of cellulose and alkali, usually referred to as alkali cellulose. Many procedures for effecting this reaction between an aralkyl halide and alkali cellulose are known to the art, but substantially all of them involve the heating together of the several reactants, usually at a temperature of from about 60° C. to about 130° C. When relatively high temperatures are employed during the reaction, it is customary to permit distillation of water and aralkyl halide from the reaction mass, the aralkyl halide, which distils over, usually being returned to the reaction mass. The amount of alkali required in the reaction may be added at the start of the reaction, but ordinarily only a portion of the necessary alkali will be added at the start of the reaction and the remainder will be added periodically during the course of the reaction.

The alkali cellulose used in the reaction is ordinarily prepared by immersing a suitable cellulosic material, such as purified cotton linters, etc., in an aqueous alkali solution of the desired concentration, which, depending upon the particular reaction procedure to be followed, may vary from about 18% to about 50%. The cellulose is permitted to absorb a maximum quantity of the aqueous alkali solution and is then pressed in order to expel a considerable quantity of alkali solution. The amount of alkali solution which is permitted to remain absorbed in the cellulose amounts to about 200–400%, by weight, of the amount of cellulose, and accordingly by far the larger part of the alkali solution initially absorbed is expelled.

Because of the preferential adsorption of alkali by the cellulose fibers, the aqueous solution expelled by pressing is of a lower alkali concentration than that originally used. The alkali solution expelled from the fibers by the pressing procedure may be fortified by the addition of fresh alkali and used again for the preparation of more alkali cellulose. There is, however, a limit to the reuse of such alkali solutions, since, especially when only partially purified cellulosic material is used in the preparation of alkali cellulose, various impurities are dissolved which are continuously built up by the reuse of the same solution until they reach a limit which renders further use of such solutions impossible.

It is apparent that it would be advantageous to use, in the preparation of alkali cellulose, only that quantity of aqueous alkali solution which is retained by the cellulose after the pressing operation. However, if such a small volume of solution were used for the impregnation of the cellulosic material, it would be absorbed completely by those fibers with which it first came in contact, and a substantial portion of the cellulose would remain entirely free from alkali. The requisite amount of alkali cannot be introduced in a large volume of water sufficient to wet all of the cellulose, because the concentration of alkali in such a solution would be far too low.

It has been found, in accordance with this invention, that an aqueous solution of alkali in the proper concentration for the preparation of alkali cellulose and in amount only equal to that which is to be retained by the alkali cellulose can be successfully utilized for the preparation of the alkali cellulose if it is emulsified in a relatively large volume of the aralkyl halide which is to be used in the preparation of the cellulose ether. By proceeding in this manner, a sufficiently large volume of liquid is obtained to thoroughly wet all of the cellulosic material, while the concentration of aqueous alkali solution is maintained sufficiently high to effect the desired results. That is to say, the aqueous alkali solution used is diluted in volume without being diluted in concentration.

It is appreciated that it has been previously proposed to use various wetting-out and emulsifying agents in the preparation of aralkyl ethers of cellulose. Such methods may be conveniently divided into two classes. In the first class, a more uniform alkali cellulose is obtained by the use of a wetting-out agent in conjunction with the aqueous alkali solution which helps the penetration and impregnation of the cellulose by such solution. These methods involve the use of large excess of alkali solution and the pressing out of the alkali cellulose formed to expel the excess alkali solution. In the second class, an emulsifying agent is used to improve the contact between the aralkyl halide and the aqueous alkali solution during the etherification reaction proper. In such methods, the emulsifying agent may be introduced before, during, or after the formation of the alkali cellulose. It will be noted that all of these methods involve the formation of alkali cellulose as a distinct intermediate, and also involve the use of excessive amounts of aqueous alkali solution, the larger part of which must be removed from the alkali cellulose after its formation.

On the other hand, the method in accordance with this invention involves the use of only that volume of aqueous alkali solution which is normally retained by the cellulose during the preparation of alkali cellulose. Furthermore, the method in accordance with this invention eliminates the necessity of forming alkali cellulose as a distinct intermediate step in the reaction and essentially reduces the etherification of cellulose to a single operation.

In the method in accordance with this invention, an aqueous alkali solution, for example, of sodium hydroxide, potassium hydroxide, etc., desirably of a concentration within the range from about 18% to about 40%, depending upon the particular etherification procedure that is to be followed, is emulsified in a relatively large quantity of the aralkyl halide which is to be used in the etherification reaction. The aqueous alkali solution will be used in an amount equal to that normally remaining in alkali cellulose after its formation; that is to say, in amount from about 200 to about 400% of the weight of cellulose. The aralkyl halide will be used in the amounts normally used in the particular etherification reaction. If desired, the alkali solution may be emulsified in somewhat smaller amounts of aralkyl halide than are to be used in the reaction, and the additional aralkyl halide may be added at a later stage in the reaction.

As an emulsifying agent, there may be used the higher fatty acids, either saturated or unsaturated, such as oleic acid, the acids of coconut oil, etc., or their corresponding alkali soaps, abietic acid or its alkali soaps, etc., sulphonated oils or aromatic sulphonic acids, etc.

The emulsion may be prepared by dissolving the emulsifying agent in that phase in which it is soluble; thus, for example, the various fatty and rosin acids in the aralkyl halide, and the various soaps and alkali salts in the aqueous alkali solution, and adding the second phase slowly thereto while imparting vigorous agitation to the mixture. The emulsion obtained is not in all cases of great stability. However, since it is to be used almost immediately, lack of stability is no particular defect.

After the emulsion has been prepared, the cellulosic material, properly shredded or otherwise finely divided, is mixed into the emulsion. During this mixing procedure, the mass should be vigorously and thoroughly agitated in order to insure uniform distribution of the alkali throughout the cellulose. Alternatively, the cellulose may be soaked in a mixture of aralkyl halide and emulsifying agent and the aqueous alkali solution then added to the mass with thorough agitation. An emulsion of the alkali is thus formed on the surface of the cellulose fibers, insuring a satisfactory distribution.

When all the components of the etherification mixture have been brought together and thoroughly mixed by any of the procedures described above, heat is applied to the reaction mass in order to start the etherification reaction. It is preferable, but not necessary, to carry out the initial stages of the reaction at a relatively low temperature and with relatively slight agitation. For example, in the manner described in my copending application, Serial No. 737,576, filed July 30, 1934, and to continue the reaction in this manner until the reaction mass attains complete uniformity. The temperature may then be increased, if desired, to a temperature at which distillation will begin. Additional alkali and additional quantities of aralkyl halide may be added to the reaction mass from time to time in accordance with the particular etherification procedure being followed. When the reaction is complete, as indicated by complete dispersion of the cellulosic fibers, the aralkyl ether of cellulose formed may be separated from the reaction mass by any of the known methods.

The following examples are illustrative of the procedure in accordance with this invention.

*Example 1.*—10 grams of rosin are dissolved in 270 grams of benzyl chloride and into the solution so formed 80 grams of a 28% sodium hydroxide solution are gradually introduced with vigorous agitation. The emulsion so formed is then quickly mixed with 25 grams of purified cotton linters. The mass so formed is then gently heated at a temperature of about 70° C. while being gently agitated, as by slow rotation of the containing vessel, which preferably has baffles attached to its interior surface. The reaction is allowed to proceed at this temperature and with this type of agitation for about 48 hours. The temperature is then raised to about 120 to 130° C., which will cause distillation of aralkyl halide and water from the reaction mass. After about one to two hours the larger part of the water present has distilled over. 40 grams of a 33% sodium hydroxide solution are then added to the reaction mass which is now subjected to vigorous agitation. Distillation is continued until practically all of the water present has distilled over, when the reaction is usually complete. If, by inspection, undispersed fibers can still be observed at this stage, additional sodium hydroxide solution may be added and the reaction continued at distilling temperature until dispersion of the fibers is complete. The benzyl cellulose formed may be separated from the reaction mixture by any known process, such as, for example, precipitation with heptane.

*Example 2.*—100 grams of purified cotton linters are immersed in 1100 grams of benzyl chloride in which 40 grams of oleic acid have been dissolved. Into this mixture 300 grams of a 30% hydroxide solution are introduced with vigorous agitation. The reaction mass is then brought to a temperature of about 80° C. and maintained at this temperature for from 36 to 40 hours, while being gently agitated. This gentle agitation may be effected by carrying out the reaction in a Werner and Pfleiderer mixer run at a very low speed. The temperature is then raised to about 110° C. and the agitation gradually increased until it is vigorous. At intervals of about 20 to 30 minutes solid sodium hydroxide is added to the reaction mixture in portions of from 12 to 25 grams. This is continued until the reaction is complete, as shown by dispersion of the cellulose fibers. The completion of the reaction, toward the end, may be hastened by increasing the temperature to a point at which distillation begins and allowing the water present to distil off. The benzyl cellulose formed may be recovered from the reaction mass in any suitable manner.

It will be understood that the method in accordance with this invention involves the treatment of cellulose with an emulsion of aralkyl halide and aqueous alkali solution and the resultant direct formation of an aralkyl ether of cellulose without the intermediate formation, as a distinct product, of alkali cellulose. Furthermore, by the method in accordance with this invention, only that quantity of aqueous alkali solution is used which is actually required in the reaction. It will be further understood that the method in accordance with this invention is applicable to any of the usual and well known procedures for the production of aralkyl ethers of cellulose and is not limited in any way by the details and examples set forth hereinabove as illustrative only.

What I claim and desire to protect by Letters Patent is:

1. The method for the preparation of aralkyl ethers of cellulose which includes treating cellulose at reaction temperature with an aralkyl halide containing an aqueous alkali solution emulsified by the action of an emulsifying agent as the disperse phase therein, the aqueous alkali solution being present in amount from about 200% to about 400% by weight of the amount of cellulose present.

2. The method for the preparation of aralkyl ethers of cellulose which includes treating cellulose at reaction temperature with an aralkyl halide containing an aqueous alkali solution having a concentration within the range of from about 18% to about 40% emulsified by the action of an emulsifying agent as the disperse phase therein.

3. The method for the preparation of aralkyl ethers of cellulose which includes treating cellulose at reaction temperature with an aralkyl halide containing an aqueous alkali solution having a concentration within the range of from about 18% to about 40% emulsified by the action of an emulsifying agent as the disperse phase therein, the aqueous alkali solution being present in amount of from about 200% to about 400% by weight of the amount of cellulose present.

4. The method for the preparation of aralkyl ethers of cellulose which includes treating cellulose at reaction temperature with an aralkyl halide and an aqueous alkali solution emulsified together by the action of a higher fatty acid.

5. The method for the preparation of aralkyl ethers of celluose which includes treating cellulose at reaction temperature with an aralkyl halide and an aqueous alkali solution emulsified together by the action of abietic acid.

6. The method for the preparation of benzyl cellulose which includes treating cellulose at reaction temperature with benzyl chloride containing an aqueous alkali solution emulsified by the action of an emulsifying agent as the disperse phase therein, the aqueous alkali solution being present in amount of from about 200% to about 400% by weight of the amount of cellulose present.

7. The method for the preparation of benzyl chloride which includes treating cellulose at reaction temperature with benzyl chloride containing an aqueous alkali solution having a concentration within the range of from about 18% to about 40% emulsified by the action of an emulsifying agent as the disperse phase therein.

8. The method for the preparation of benzyl cellulose which includes treating cellulose at reaction temperature with benzyl chloride containing an aqueous alkali solution having a concentration within the range of from about 18% to about 40% emulsified by the action of an emulsifying agent as the disperse phase therein, the aqueous alkali solution being present in amount of from about 200% to about 400% by weight of the amount of cellulose present.

9. The method for the preparation of benzyl cellulose which includes treating cellulose at reaction temperature with benzyl chloride and an aqueous alkali solution emulsified together by the action of a higher fatty acid.

10. The method for the preparation of benzyl cellulose which includes treating cellulose at reaction temperature with benzyl chloride and an aqueous alkali solution emulsified together by the action of abietic acid.

11. The method for the preparation of aralkyl ethers of cellulose which includes treating cellulose at reaction temperature with an aralkyl halide and an aqueous alkali solution emulsified together by the action of an emulsifying agent.

12. The method for the preparation of aralkyl ethers of cellulose which includes treating cellulose at reaction temperature with an aralkyl halide containing an aqueous alkali solution emulsified by the action of an emulsifying agent as the disperse phase therein.

13. The method for the preparation of benzyl cellulose which includes treating cellulose at reaction temperature with benzyl chloride and an aqueous alkali solution emulsified together by the action of an emulsifying agent.

14. The method for the preparation of benzyl cellulose which includes treating cellulose at reaction temperature with benzyl chloride containing an aqueous alkali solution emulsified by the action of an emulsifying agent as the disperse phase therein.

15. The method for the preparation of aralkyl ethers of cellulose which includes impregnating cellulose with an aralkyl halide containing an emulsifying agent dissolved therein, adding an aqueous alkali solution to the impregnated cellulose, and heating the mixture at reaction temperature.

16. The method for the preparation of benzyl cellulose which includes impregnating cellulose with benzyl chloride containing an emulsifying agent dissolved therein, adding an aqueous alkali solution to the impregnated cellulose, and heating the mixture at reaction temperature.

EUGENE J. LORAND.